(12) United States Patent
Busha et al.

(10) Patent No.: US 7,591,498 B2
(45) Date of Patent: Sep. 22, 2009

(54) SLIDING CONSOLE

(75) Inventors: Bryan Busha, Grand Blanc, MI (US); Joseph P. Wieczorek, Lake Orion, MI (US)

(73) Assignee: Irvin Automotive Products, Inc., Pontiac, MI (US)

(*) Notice: Subject to any disclaimer, the term of this patent is extended or adjusted under 35 U.S.C. 154(b) by 247 days.

(21) Appl. No.: 11/807,248

(22) Filed: May 24, 2007

(65) Prior Publication Data

US 2008/0290680 A1    Nov. 27, 2008

(51) Int. Cl.
*B60R 7/04* (2006.01)

(52) U.S. Cl. .................... 296/24.34; 224/281; 296/37.8

(58) Field of Classification Search ............. 224/42.32, 224/275, 285; 248/297.21, 297.31, 424, 248/429; 296/24.34, 37.8, 65.13
See application file for complete search history.

(56) References Cited

U.S. PATENT DOCUMENTS

| | | | | |
|---|---|---|---|---|
| 2,277,947 | A * | 3/1942 | Bailey | ............ 248/429 |
| 3,177,033 | A | 4/1965 | Daniels | |
| 3,356,409 | A | 12/1967 | Belsky et al. | |
| 3,652,050 | A * | 3/1972 | Marrujo et al. | ............ 248/429 |
| 3,930,632 | A * | 1/1976 | Shigeta et al. | ............ 248/429 |
| 4,040,659 | A | 8/1977 | Arnold | |
| 4,262,963 | A * | 4/1981 | Bauer et al. | ............ 297/473 |
| 4,417,764 | A | 11/1983 | Marcus et al. | |
| 4,453,759 | A | 6/1984 | Kathiria | |
| 4,512,503 | A | 4/1985 | Gioso | |
| 4,598,948 | A | 7/1986 | Flowerday | |
| 4,730,804 | A * | 3/1988 | Higuchi et al. | ............ 248/429 |
| 4,756,459 | A | 7/1988 | Hardman | |
| 4,772,165 | A | 9/1988 | Bartkus | |
| 4,779,923 | A | 10/1988 | Lang et al. | |
| 4,813,582 | A | 3/1989 | Henricksen et al. | |
| 4,818,017 | A | 4/1989 | Dykstra et al. | |
| 4,842,175 | A | 6/1989 | Towsend | |
| 4,909,469 | A * | 3/1990 | Nihei et al. | ............ 248/429 |
| 4,934,750 | A | 6/1990 | Eichler et al. | |
| 4,961,559 | A * | 10/1990 | Raymor | ............ 248/429 |
| 5,076,641 | A | 12/1991 | Lindberg | |
| 5,106,143 | A | 4/1992 | Soeters | |
| 5,338,081 | A | 8/1994 | Young et al. | |
| 5,433,509 | A | 7/1995 | Hotary et al. | |
| 5,562,331 | A | 10/1996 | Spykerman et al. | |

(Continued)

FOREIGN PATENT DOCUMENTS

JP     58016929 A  *  1/1983

(Continued)

*Primary Examiner*—Glenn Dayoan
*Assistant Examiner*—Paul A Chenevert
(74) *Attorney, Agent, or Firm*—Raggio & Dinnin, P.C.

(57) ABSTRACT

A sliding storage console for use in a vehicle. The sliding storage console includes a rail and a body. The sliding storage console also includes a handle arranged on the body. The sliding storage console has an upper housing engaged with the body and a lower housing engaged with the upper housing. The sliding console also includes an actuator arranged between the upper and lower housing. A slider is connected to a lower housing and engaged with the rails. The sliding console also includes a latch plate arranged on the slider and engaged with the actuator to allow for locking of the sliding console at predetermined locations along the rail.

23 Claims, 5 Drawing Sheets

U.S. PATENT DOCUMENTS

| | | | |
|---|---|---|---|
| 5,611,589 A * | 3/1997 | Fujii et al. | 296/64 |
| 5,641,146 A * | 6/1997 | Hoshihara et al. | 248/430 |
| 5,845,965 A | 12/1998 | Heath et al. | |
| 5,899,544 A | 5/1999 | James et al. | |
| 5,924,616 A | 7/1999 | Shives | |
| 6,045,173 A | 4/2000 | Tiesler et al. | |
| 6,086,129 A | 7/2000 | Gray | |
| 6,116,674 A | 9/2000 | Allison et al. | |
| 6,135,529 A | 10/2000 | De Angelis et al. | |
| 6,203,088 B1 | 3/2001 | Fernandez et al. | |
| 6,250,729 B1 | 6/2001 | Allison et al. | |
| 6,264,261 B1 | 7/2001 | Krafcik | |
| 6,419,314 B1 | 7/2002 | Scheerhorn | |
| 6,497,441 B1 * | 12/2002 | Mahmood et al. | 296/24.34 |
| 6,547,299 B2 | 4/2003 | Atanasiu et al. | |
| 6,572,169 B2 | 6/2003 | Panhelleux et al. | |
| 6,655,561 B2 | 12/2003 | Panhelleux et al. | |
| 6,752,444 B2 * | 6/2004 | Kitano et al. | 296/184.1 |
| 7,066,521 B2 * | 6/2006 | Jung et al. | 296/65.13 |
| 7,152,897 B2 * | 12/2006 | Bonnes et al. | 296/35.1 |
| 7,258,381 B2 * | 8/2007 | Sturt et al. | 296/24.34 |
| 7,401,831 B2 * | 7/2008 | Sturt | 296/37.8 |
| 7,441,822 B1 * | 10/2008 | Day | 296/65.11 |
| RE40,617 E * | 1/2009 | Canni et al. | 296/37.8 |
| 7,513,007 B2 * | 4/2009 | Chernoff | 15/313 |
| 2003/0168567 A1 * | 9/2003 | Klahold et al. | 248/429 |
| 2003/0197392 A1 * | 10/2003 | Clark et al. | 296/24.1 |
| 2006/0113810 A1 * | 6/2006 | Kuhl et al. | 296/24.34 |
| 2006/0214471 A1 * | 9/2006 | Anderson et al. | 296/187.01 |
| 2007/0075107 A1 * | 4/2007 | Brancheriau et al. | 224/281 |

FOREIGN PATENT DOCUMENTS

| | | | |
|---|---|---|---|
| JP | 61163035 A | * | 7/1986 |
| JP | 04024134 A | * | 1/1992 |
| JP | 04024135 A | * | 1/1992 |

* cited by examiner

SLIDING CONSOLE

FIELD OF THE INVENTION

The present invention generally relates to a console for a vehicle, and more particularly, relates to a sliding storage console for use in an automotive vehicle.

BACKGROUND OF THE INVENTION

Floor and ceiling consoles have been used in vehicles for many years. Prior art floor consoles may include armrests with storage compartments, cup holders, ashtrays, power points, and the like. Generally, these consoles are mounted to a vehicle by brackets or fastened to the floor of the vehicle by bolts or other fasteners and generally, once installed within the vehicle they are not intended to be moved within the vehicle or removed from the vehicle. Typically, these vehicle consoles in the prior art were for storage of articles and were mounted between the seats of the vehicle and in some cases even included fixed arm rests. Some of these prior art consoles have been made to be portable and can be attached to the vehicle seats themselves. These consoles provide the vehicle occupants with some storage and usefulness even though restricted space between vehicle seats may reduce the effectiveness of such consoles. Meanwhile, many vehicle owners demand much more space available within the vehicle. Most prior art consoles and other storage devices are fixed at one location within the automotive vehicle; this may limit potential interior configurations for the vehicle. Therefore, the ability to have a storage console that is relocatable within the vehicle will provide for various interior configurations to be created by the vehicle owner and will also allow the vehicle owner to have the option of moving the console to a number of predetermined locations within the vehicle interior pursuant to the needs of the vehicle user. Also, it should be noted that many of these prior art storage consoles may include a bin and cup holder, but not many other accessories to accommodate the many articles that vehicle passengers need stored in today's vehicles, including specific areas to allow for maximize interior space while also having a location for every article the vehicle occupants need or want to carry within the automotive vehicle.

Therefore, there is a need in the art for a sliding storage console that is capable of being slid to various locations within the interior configuration of an automotive vehicle. It should be noted that there is also a need in the art for a sliding storage console that slides along a rail wherein the rail can be fixed on any of the interior surfaces of the automotive vehicle including the floor of the vehicle, side walls, roofs or ceilings or any other possible configuration within an automotive vehicle, including but not limited to, within the trunk or cargo carrying space of a vehicle. There also is a need in the art for a sliding storage console that includes many features that will be used to store specific items within the console and also allow for electrical connections and power points to extend from the console or within the console. There also is a need in the art for a storage console that reduces the costs for the manufacturer by having a multi function console that is moveable within an automotive vehicle interior but still is capable of passing the numerous safety standards necessary in modern day vehicles.

SUMMARY OF THE INVENTION

One object of the present invention may be to provide a sliding storage console for a vehicle.

Another object of the present invention may be to provide a sliding storage console that is capable of being slid along a rail arranged within a vehicle interior.

Still another object of the present invention may be to provide a sliding storage console that is capable of being positioned at a plurality of positions along a rail within the vehicle interior.

Still another object of the present invention maybe to provide a sliding console that will allow for different configurations of an interior of a vehicle at a lower cost to the manufacturer and consumer.

Still another object of the present invention may be to provide a sliding storage console that is capable of withstanding the internal forces applied to a console by users of the vehicle and other random objects.

Yet another object of the present invention maybe to provide a sliding storage console that uses a dual rail system to secure the sliding console within the vehicle at predetermined positions anywhere between the end of the vehicle and the front of the interior of the vehicle.

According to the present invention, the foregoing and other objects and advantages are obtained by a novel design for a sliding storage console. The sliding storage console is for use in a vehicle having an interior cabin or compartment. The sliding console will include a rail secured to an interior surface of the vehicle and a body slidingly arranged on the rails. The console will also include an upper housing engaged with the body and a handle arranged on the body of the console. A lower housing will be engaged with the upper housing while an actuator will be arranged between the upper and lower housing. The sliding console also will include a slider connected to the lower housing and engage with the rail and a latched plate arranged on the slider engaged with the actuator. This will allow the sliding console to be arranged at any predetermined number of positions within the vehicle, preferably any location between the dashboard and the rear portion of the interior of the vehicle. The sliding storage console may also include a cup holder arranged on a front surface of the console along with a storage tray arranged on a top surface. The storage console may also include a cup holder arranged on or within a rear surface of the console along with an external/internal power point. The internal power point may be located within the inner cavity of the storage console. The sliding storage console may also be locked at multiple positions within the automotive interior depending on the design requirements of the automotive manufacturer. The sliding storage console may also include a cell phone holder, a band aid holder, a coin holder, along with tissue or handi wipe holders and a flash light holder. The storage console may also include an interior light and an electrical connection to the automotive vehicle electronic system. The sliding storage console may also include a storage tray located within the cavity of the console that may or may not include a lid and a snap in tray that may be conveniently stored within the inner cavity of the storage console, which is capable of being mounted to the cup holder arranged on the front exterior surface of the sliding storage console. It should also be noted that a map pocket or any other type of pocket may also be arranged on a side surface or the exterior of the sliding storage console.

One advantage of the present invention is that it may provide an improved sliding storage console for use in a vehicle.

Still another advantage of the present invention is that it may provide a sliding storage console that may be used at a multitude of positions within the vehicle interior along a rail fixed to a surface of the vehicle interior.

Yet another advantage of the present invention may be that it provides a sliding storage console that includes a plurality of options to hold and store components and accessories used by users of the vehicle.

Still another advantage of the present invention may be that it provides a sliding storage console that is capable of being fixed to the rail such that the console may not be removed or that it may be designed to be removed from the rail and removed from the vehicle for storage away from the vehicle.

Still another advantage of the present invention is that it may provide a sliding storage console that will allow for a multitude of vehicle interior configurations.

Yet another advantage of the present invention may be that it provides a low cost, easy to manufacture storage console for use in a vehicle.

Other objects, features and advantages of the present invention will become apparent from the subsequent description and the appended claims, taken in conjunction with the accompanying drawings.

DESCRIPTION OF THE PREFERRED EMBODIMENT(S)

Figure 1:
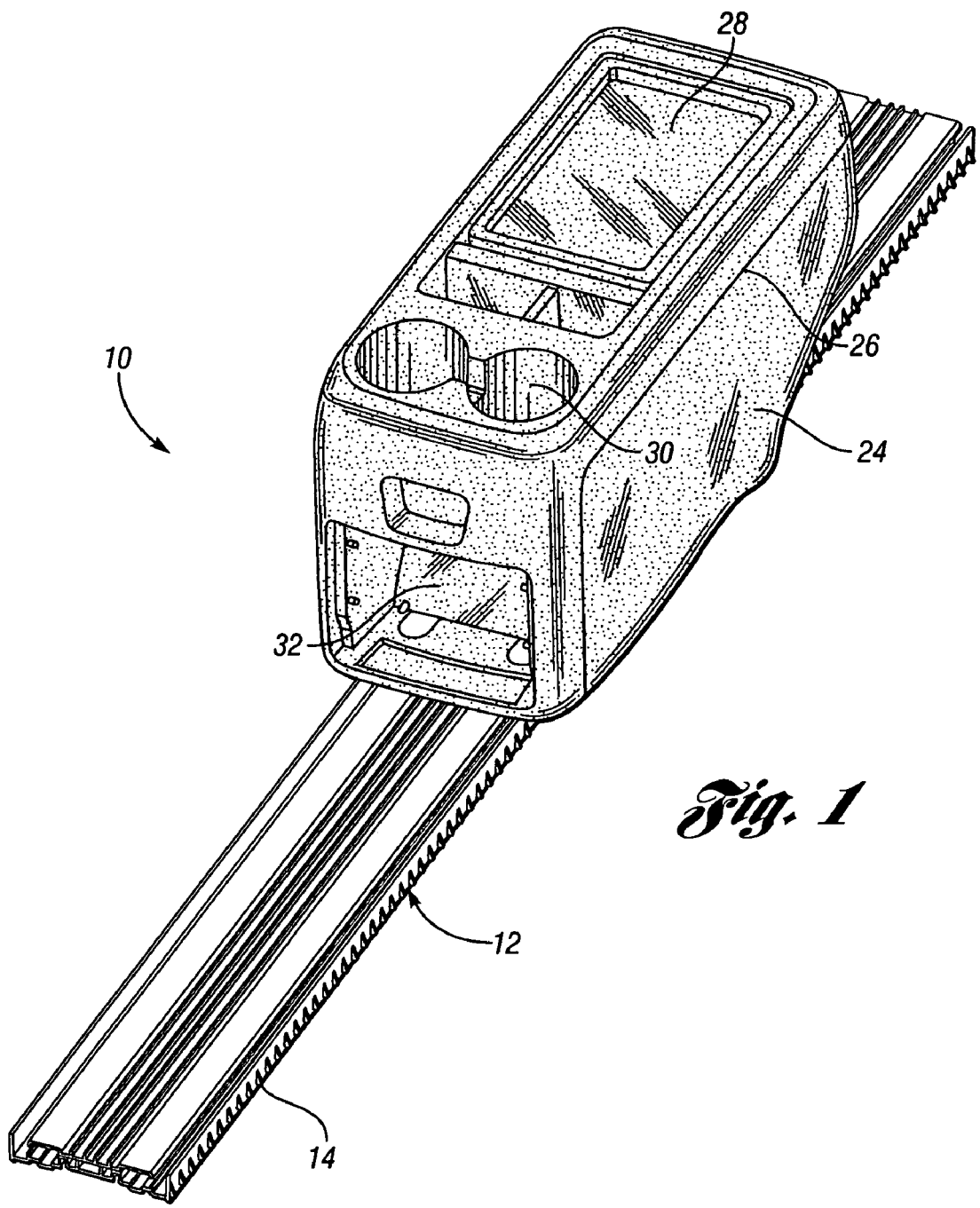
FIG. 1 shows a sliding storage console according to the present invention.
Figure 2:
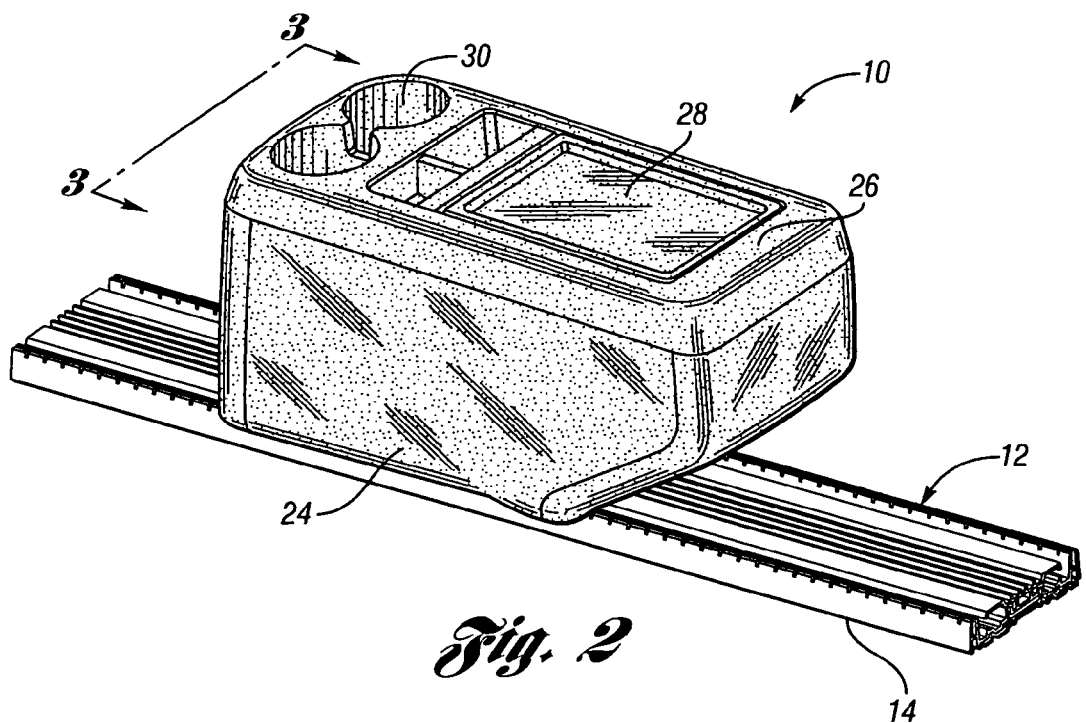
FIG. 2 shows a side view of a sliding storage console according to the present invention.
Figure 3:
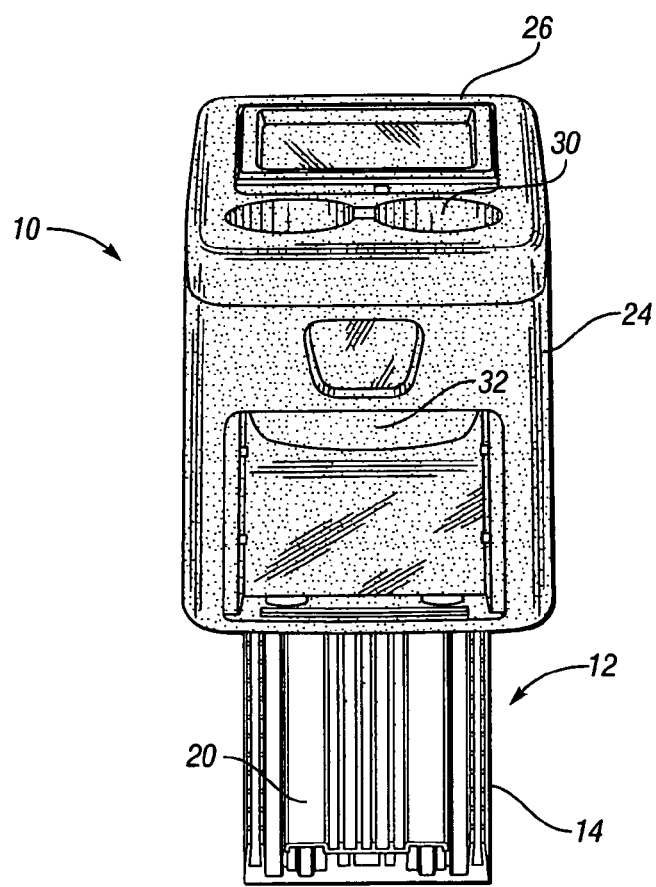
FIG. 3 shows an end view of a sliding storage console according to the present invention.
Figure 4:
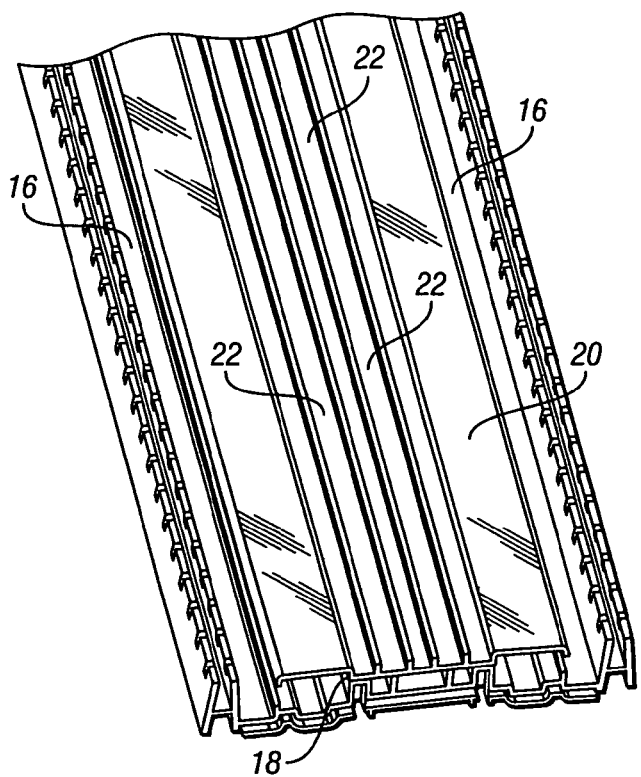
FIG. 4 shows a rail for use with the sliding storage console according to the present invention.
Figure 5:
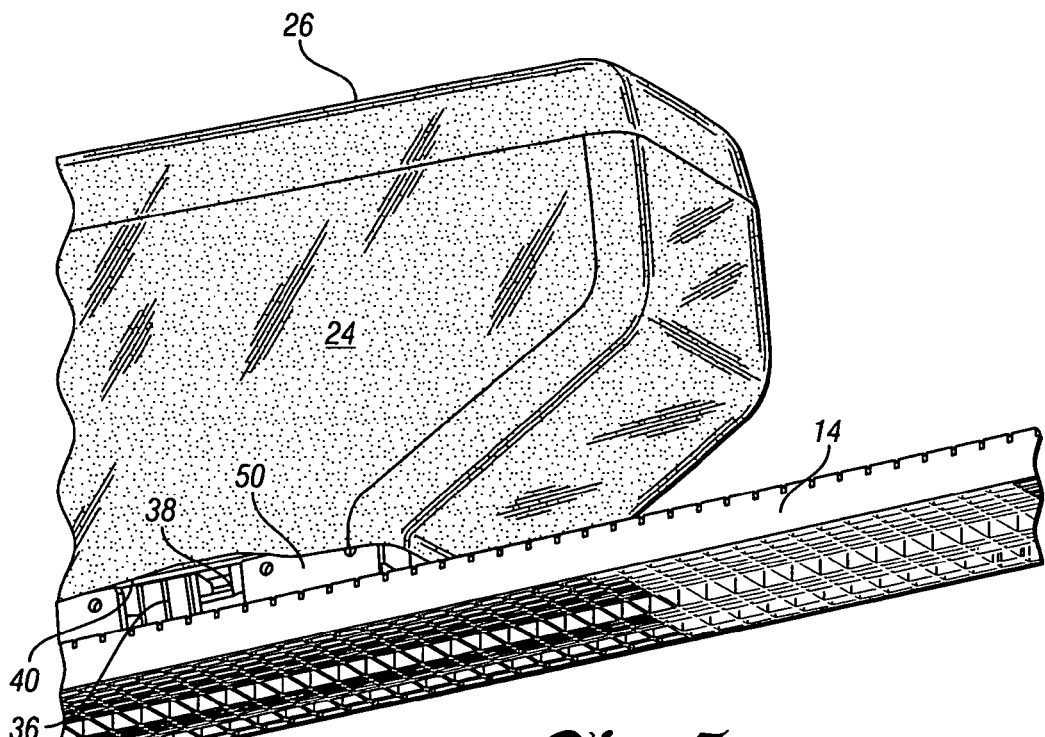
FIG. 5 shows a partial cutaway view of a sliding storage console according to the present invention.
Figure 6:
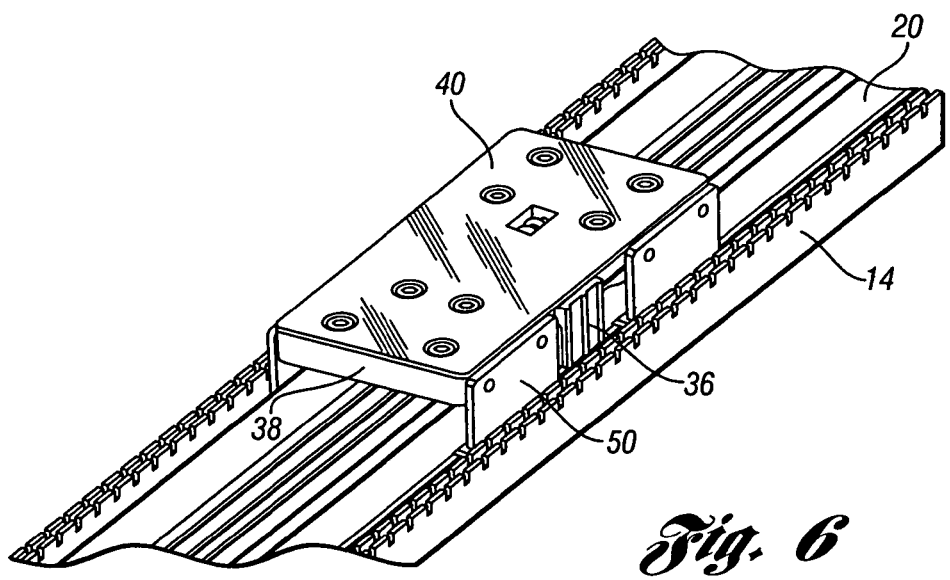
FIG. 6 shows a sliding storage console with the console body removed for clarity according to the present invention.
Figure 7:
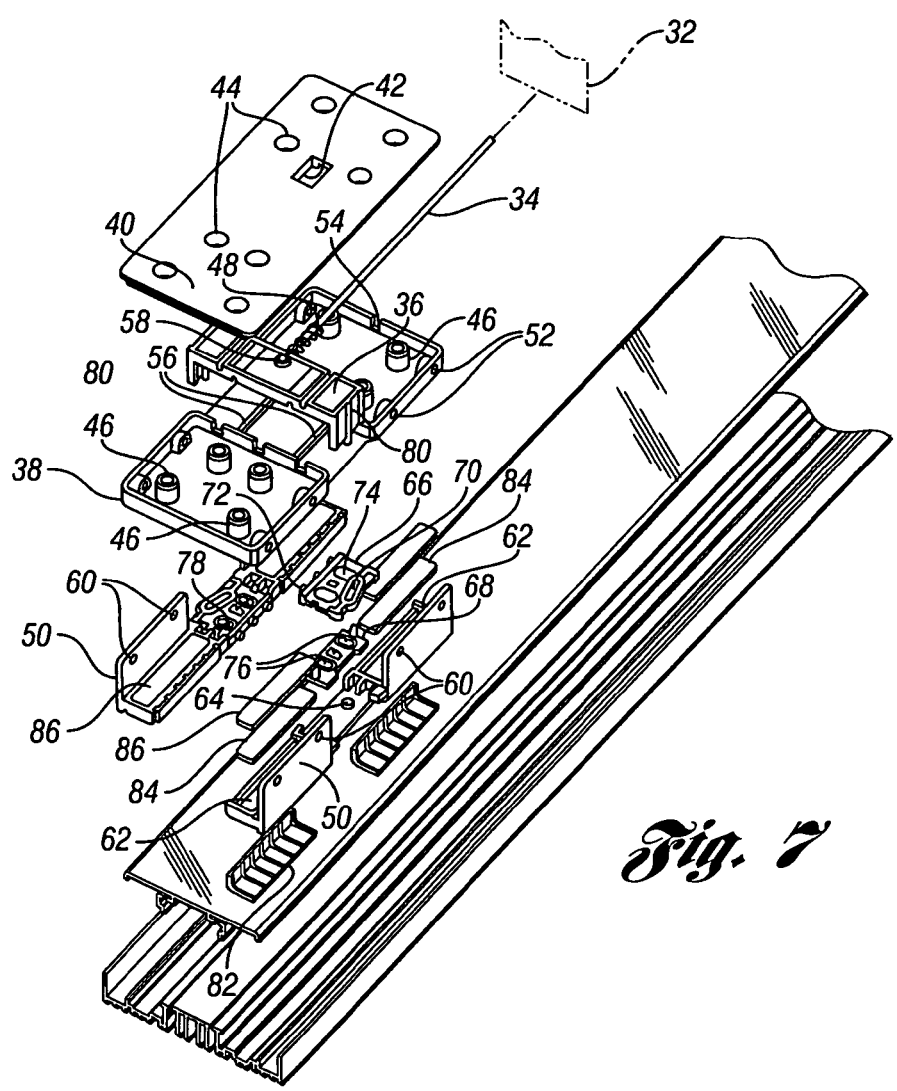
FIG. 7 shows an exploded view of a sliding storage console according to the present invention.
Figure 7A:
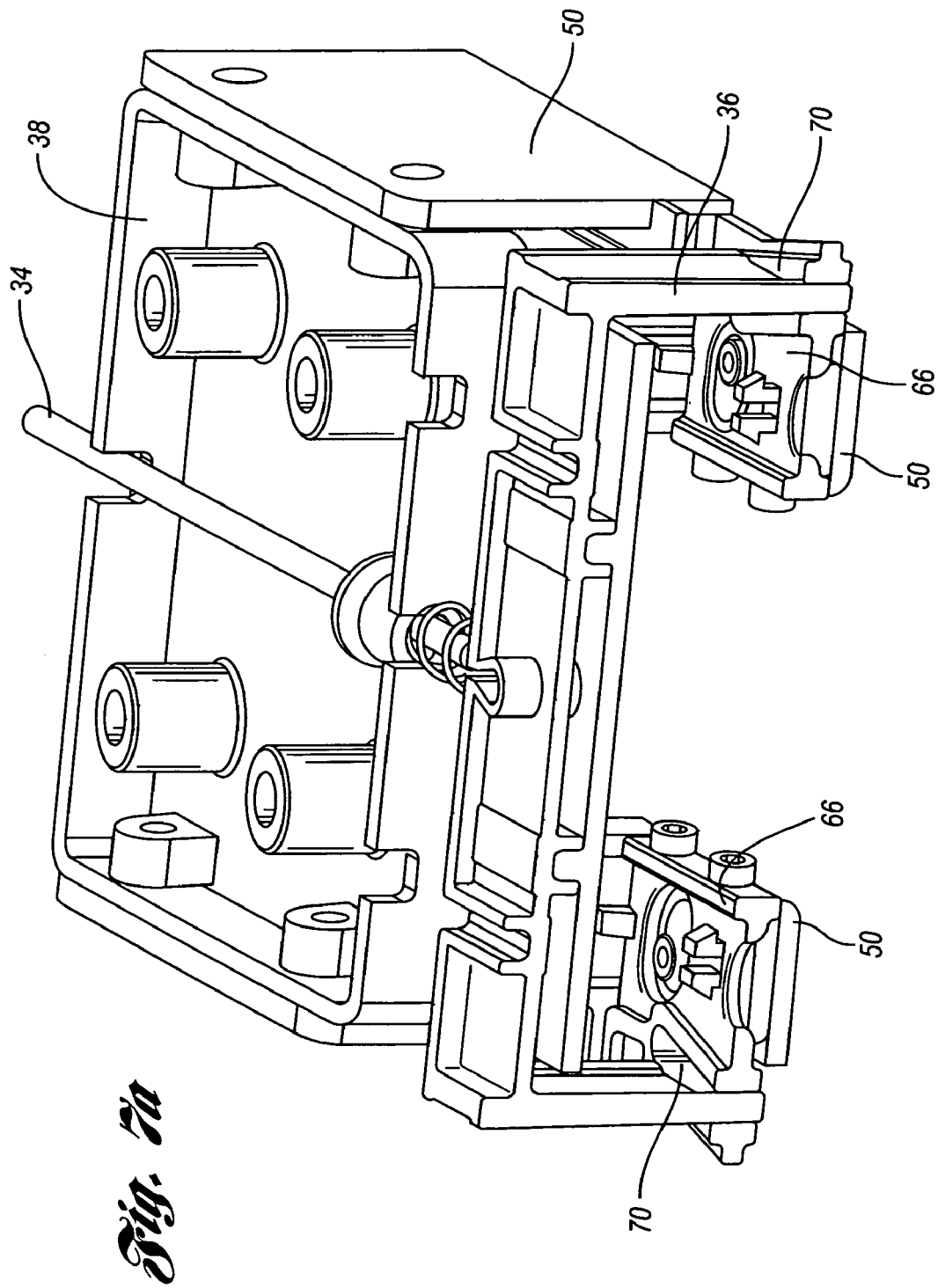
FIG. 7a shows an enlarged view of an actuator in cooperation with a latch plate and a slider according to the present invention.

Referring to the drawings, FIGS. 1 through 8 show one contemplated embodiment of a sliding storage console 10 according to the present invention. The sliding storage console 10 may be used in any known vehicle interior. In one contemplated embodiment, the console 10 will be capable of being used at multiple locations within the interior of a vehicle. These locations may be located anywhere between the dash board of the vehicle, the first row seats, the second row of passenger seats and even the third row of passenger seats or hidden rear compartments, such as a trunk of a vehicle. However, it should be noted that the sliding storage console 10 may be used at other locations within the interior of the automotive vehicle depending on the design requirements and the configuration of such interior components. Generally, these other locations may be anywhere within the trunk of a vehicle, on the roof of a vehicle, and/or on any of the side walls of the interior of the vehicle. It should be noted that the sliding storage console 10 generally has parts made of an ABS material, aluminum material, PTFE materials, or any other known material. However, it should further be noted that any known plastic, composite, rubber, metal, natural material, fabric, etc., may be used to construct the sliding storage console 10 and all of its components for use in the interior of the automotive vehicle according to the present invention. It should also be noted that the sliding storage console 10 may be used in other vehicles other than automotive vehicles, such as space, marine, aeronautical, or any other known vehicle type.

An automotive vehicle for which the sliding storage console 10 generally will be arranged within usually has a passenger compartment that may include a first and second row of seats and even a third row of seats in some vehicle configurations. The first row of seats generally include the driver seat and passenger seat with a space therebetween. The second row of the vehicle seats generally is located rearward in the passenger compartment and may even include a pair of seats and/or bench seats depending on the interior configuration. Bucket seats are used in the second or third row of seats, a space is generally located therebetween. The sliding storage console 10 of the present invention may be located anywhere within the interior of the automotive vehicle, but is contemplated to be located between the driver and passenger seat or between a first and second seat in a second or third row of the automotive vehicle. It should be noted that the sliding storage console 10 is also contemplated to be arranged anywhere along a rail secured between such seating configurations not just directly in between such seats but about any other position along the rail.

The sliding storage console 10 includes a rail 12 to form a system that allows the storage console 10 to slide within the automotive vehicle. The rail 12 in one embodiment is secured to the floor of the automotive vehicle. It should be noted that the rail 12 may be secured to any other interior surface of the vehicle, depending on the design requirements. The rail 12 enables for sliding of the storage console 10 to numerous predetermined locations within the vehicle depending on the design requirements and where the user wants it within the vehicle. Generally, the rail 12 includes a lower or bottom rail 14 that is fixed to the vehicle interior, generally the vehicle floor, via a plurality of orifices 16 through a surface of the rail bottom 14. It should be noted that any known fastener may be used to fix and secure the lower rail 14 to the vehicle. The lower rail 14 generally is made of a plastic ABS material, but any other known material may be used for the lower rail 14. The lower rail 14 may include a longitudinally arranged first and second track. Along an inner wall of the track may be located a plurality of locking orifices 18 that will be used to lock the sliding console 10 at a predetermined position within the vehicle interior. The orifices 18 may be of any general shape, including but not limited to circular, square, triangular, random, octagonal, pentagonal or any other known shape. Fixed to a top surface of the lower rail 14 is an upper or top rail 20. A plurality of orifices 22 are arranged through the upper rail 20 which will allow for fasteners to secure the top rail 20 to the bottom rail 14 at predetermined locations to ensure a secure connection between the top rail 20 and bottom rail 14. The upper rail 20 may be secured such that a first and second track are arranged longitudinally along the length of the rail 12 which is fastened to the vehicle floor or the like a predetermined distance within the vehicle interior. It should be noted that the rail 12 may be arranged along the entire length of the interior of the vehicle including or excluding that of trunk storage space or just a predetermined length within the interior of the vehicle, depending on the design requirements. The upper rail 20 is made of an aluminum material, however any other type of material including any other metal, plastic, ceramic, composite or the like may be used for the top rail 20. It should be noted that in one contemplated embodiment the upper rail 20 will include a plurality of orifices on a surface therein wherein the orifices will be used to lock the sliding console 10 at a predetermined position along the rail 12 within the interior of the vehicle component. It should be noted that the orifices may be of any known shape, such as circular, triangular, square, rectangular, octagonal, pentagonal, or random shape or any other known shape. Hence, depending on the design requirements the locking orifice 18 may be arranged in the top rail 20 or bottom rail 14 of the sliding console system. It should be noted that generally the top and bottom rails may be made extrusion, casting or machining or any other known forming or manufacturing process.

The sliding console 12 includes a main body 24 having an inner cavity that defines an interior of the sliding console 10. In one contemplated embodiment the sliding console 10 has an opening at a top end thereof. The opening is covered by a lid 26 that is secured to the top of the console body 24 by a latch mechanism on one end and by a hinge on the rearward end. The lid 26 generally pivots upward in the rearward direction, however it should be noted that it is contemplated that the lid 26 will pivot in a forward direction, towards the passenger or towards the driver of the automotive vehicle. It is also contemplated to have the lid slide in any known direction to allow for entry into the interior of the sliding console 10. These contemplated pivot directions are also applicable to a sliding storage console in its other possible locations throughout the automotive interior. The lid 26 may also include a sliding cover, which may act as an armrest or other device for the occupant's of the automotive vehicle. In one contemplated embodiment, the sliding cover of the lid will slide in a rearward direction towards the rear of the automotive vehicle. Any known latch, hinge, and/or sliding mechanism may be used for the sliding storage console 10 according to the present invention. Such systems may be already be in possession of the Applicant and may be incorporated into the design including those patented or pending patents of the Applicant.

The top of the lid 26 may also include a small cavity or depression 28 therein that will provide a storage tray for use by the occupants of the vehicle. The storage tray is preferably molded into the top portion of the lid 26. It should also be noted that the lid 26 may not slide with respect to the sliding console body 24. However, it is also contemplated to have a removeable storage tray arranged within an orifice of the cover of the lid 26. The lid 26 may be capable of sliding in a rear direction of the vehicle a predetermined distance depending on the design requirement and strength needed for the lid 26. It is also contemplated to have a lid 26 that may slide forward and to have other storage compartments arranged on the top of the sliding console 10.

The sliding storage console 10 may also include a fixed front cup holder 30 arranged on a top surface of the sliding storage console 10. In the embodiment shown, the cup holder 30 has a generally figure eight appearance when viewed from above and includes storage space for a first and second cup or the like. It should be noted that the cup holder 30 may have any known appearance. The fixed cup holder 30 may be molded directly into the top surface of the sliding console 10. However, it is also contemplated to have a fixed cup holder that may be attached to the front surface of the sliding console by any known latch or fastener mechanism capable of holding a fixed cup holder at a predetermined position on a front surface of the sliding console 10. The fixed cup holder generally has a first and second storage space or cavity that will generally be deep enough to hold both standard and oversized cups, bottles or the like. It should also be noted that the cup holder 10 generally is arranged on a top front surface of the lid 26 such that a passenger and driver of the automotive vehicle and/or passengers in the rear may easily access the holder and its contents. It should be noted that the sliding console 10 may also include a cup holder that is stored within the interior of the console, such as a push pull cup holder, and may also include an external power point and a net pocket arranged on any of the surfaces of the sliding console 10. Furthermore, it is contemplated to mold pockets directly into the side surfaces and/or other top surfaces of the sliding console such that storage pockets may be located on both sides, one side or the top of the surfaces of the sliding console 10.

It should also be noted that the interior of the sliding console 10 may include an area for storage of items within the storage console. It is contemplated that the bottom of the interior cavity may contain a covered storage member that may include a cover or lid. The storage member may also have a lid that pivots in any four directions to provide covered storage at the bottom of the interior cavity of the sliding storage console 10. The storage member may also include a notch in one end thereof to allow for easy opening of the lid when the lid is in a closed position. There also may be within the interior trays holders for CD's, cassettes, pens or other media and components. It is also contemplated to just have a bin with no holders therein but a large interior surface. Furthermore, it is also contemplated that the sliding storage console 10 may include interior cavities that include an interior power point or the like. It is also contemplated to have on the interior cavity of the sliding console 10 flashlight holders and/or lighted switch to provide light therein. It is also contemplated to have arranged in an inner surface of the storage console mounting brackets that will allow for mounting of bandage holders, coin holders, cell phone holders, wipe holders, internal cup holders, or the like. It is also contemplated to have a tissue holder molded directly therein either on a bottom surface of the lid or the like.

It is also contemplated to have the sliding storage console 10 include snap in trays that may be arranged within the front cup holders or other cup holders arranged on an outer surface of the storage console. It should be noted that all of the features discussed above may be used in the sliding console 10 or only selected features may be incorporated into the sliding console 10 depending on the design requirements and consumer requirements for the manufacturer of the sliding console 10 and the vehicle into which the sliding console will be placed on the interior thereof. It should also be noted that contemplated trays and compartments may be used on any outside surface of the sliding console 10 or any interior surface of the console. Furthermore, any number of electrical connections may be arranged on the sliding storage console 10 if design requirements so require.

The sliding storage console 10 may also include a handle 32 that is arranged on a bottom portion of a front surface of the sliding console 10 below the fixed cup holder. However, it should also be noted that the handle 32 may be arranged on a back surface of the sliding console 10 to allow for easy access by the user of the automotive vehicle. The handle 32 generally may be arranged within an indentation of the sliding console 10 such that a user's hand can grasp one end of the handle 32 and move the handle 32 between a home position and a release position. The home position generally has the handle parallel to the outer surface of the sliding console 10 and in the released position the handle 32 rotates about a pivot point near a top portion of the handle 32. It should be noted that the handle 32 may also be located and arranged on the interior cavity of the sliding console 10 to hide the handle from the exterior surfaces of the sliding console 10. Attached to the handle on a surface thereof is a cable 34 or other fastening like device. The cable 34 will be connected on one end to the handle 32 such that when the handle 32 is moved to its release position the cable 34 will move an actuator 36 on the sliding console 10 to allow for the console 10 to be slid to a location anywhere along the rail 12 within the interior of the vehicle. It should be noted that any type of device capable of moving other than a cable 32 may also be used to connect with the handle 32, such as but not limited to a rod, a screw type mechanism, or any other type of mechanism capable of moving.

The sliding console 10 further includes a lower housing 38 and an upper housing 40. The upper housing 40 generally has a rectangular appearance with a predetermined shaped orifice 42 through a surface thereof. It should be noted that any other shape may be used for the upper housing 40 and orifice 42. Generally, the upper housing 40 is made from ABS material, but any other material such as plastic, metal, ceramic, composite, rubber or the like may also be used for the upper housing 40. The upper housing 40 also may have a plurality of connecting orifices 44 therethrough, however any known shape may be used for orifices 44. The orifices 44 align and interact with threaded or non threaded connecting members 46 of the lower housing 38. The orifice 42 through a surface of the upper housing 40 will align with the cable 34 connected to the handle 32 of the sliding console 10. A spring 48 is arranged over the cable 34 and will mate with a surface of the orifice 42 of the upper housing 40 on one end and with a surface of the actuator 36 on the other end. It should be noted that the spring 48 used may be a compression spring that generally is a made of a metal material, however any other type of spring and any known material can be used for spring 48 including but not limited to plastic, composite, ceramic, natural materials or the like. The upper housing 40 contacts and engages the lower housing 38. The body 24 contacts and engages the upper housing 40. The body 24 is secured to the upper and lower housing 40, 38 via fastener arranged through orifices of the body 24 and orifice 44 of the upper housing 40 and connecting members 46 of the lower housing 38. Any known fastener can be used such as a screw, bolt, nail, or any other type of fastening device and fastening methodology. In the embodiment shown are a total of eight orifices 44 used to allow for eight fasteners to secure the body 24 to the upper housing 40 and the lower housing 38. Generally, the lower housing 38 is made of a cast aluminum, however any other type of metal, plastic, ceramic, composite, or natural material may be used for the lower housing 38. The lower housing 38 also includes a notch 54 in one end thereof to allow for the cable 32 to slidingly pass therethrough. The lower housing 38 also includes a plurality of threaded or non threaded connecting orifices or members 52 through a side surface thereof. Generally, these orifices 52 are threaded and will receive a fastener for securing of a slider 50 to the lower housing 38.

An actuator 36 generally having a C-shaped cross section is arranged between the upper 40 and lower housing 38. The actuator 36 is arranged within a track formed near a general mid point of the lower housing 38 and upper housing 40. The lower housing 38 may have a first and second raised rib 56 aligned parallel to one another while the actuator 36 may have a first and second groove aligned with and mating with the rib 56 on the lower housing 38 to properly align the actuator 36 between the upper 40 and lower housing 38. It is also contemplated to have grooves on the top surface of the actuator 36 to align with a rib on a bottom surface of the upper housing 40. The actuator 36 may also include a connector cavity or port 58 to connect the cable 34 to the actuator 36 on one end thereof while the opposite end of the cable 34 is connected to the handle 32. It should be noted that the actuator 36 will slide with relation to the upper and lower housing 40, 38 a predetermined distance defined by two stop surfaces on the lower housing 38. This sliding of the actuator 36 will allow for the locking of the sliding console 10 to the rail 12 and the disengagement of the locking system from the rail 12 to allow for the sliding console 10 to be slid to another predetermined location on the rail 12.

The sliding console 10 also includes a slider 50 arranged on each side of the lower housing 38. The slider 50 will have a plurality of orifices 60 that will align with the plurality of connecting orifices 52 arranged on the side of the lower housing 38. In the embodiment shown four fasteners will be used to connect each slider 50 to one side of the lower housing 38. Generally, the sliders 50 are made of a cast aluminum material, however any other material such as any other metal, plastic, ceramic, composite, or the like may be used for the sliders 50. The sliders 50 generally will have an L-shaped cross section and a first and second pocket 62 arranged on the top surface thereof. The sliders 50 also may include at their mid section a first and second raised connecting member 64. These will be arranged on a top surface of the slider 50 at a portion where no side wall is arranged thereon. These connecting members 64 generally may be threaded or not threaded and will be used to receive a fastener to secure a latch plate 66 and latch insulator 68 thereon.

A latch plate 66 and latch insulator 68 are secured to a top surface of the slider 50 via the connecting member 64. The latch plate 66 generally includes a predetermined angled track 70 that will allow for movement of the latch plate 66 with respect to the slider 50 and hence, the rail 12. The latch plate 66 generally includes at least one locking member 72 extending from a surface thereof. In the embodiment shown the locking members 72 generally have the form of a cylindrical tab or peg extending therefrom. In the embodiment shown the latch plate 66 includes three locking members 72 extending therefrom. However, any other number of locking members 72 and any locking member having any other known shape other than circular may also be used for the present invention. The latch plate 66 also may include a first and second orifice 74 through a surface thereof that will be arranged over the connecting members 64 of the slider 50. Arranged between one surface of the latch plate 66 and the surface of the slider 50 is the latch insulator 68.

The latch insulator 68 may generally be made of a PTFE material, however any other plastic, ceramic, metal, any natural material or the like may also be used for the latch insulator 68. The latch insulator 68 may have a finger locking mechanism 76 that will engage with an orifice or end surface on the latch plate 66 to secure the latch plate 66 to the latch insulator 68 when the latch insulator 68 will be secured to the slider 50 via any known fastener. It should be noted that the fasteners that secure the latch insulator 68 and latch plate 66 to the slider 50 may be such that they will allow for relative movement between the slider 50 and the latch plate 66 and latch insulator 68 and as such will not be so tight such that no lateral movement may occur between the slider 50 and the latch plate 66. The latch insulator 68 may have a first and second orifice 78 therethrough and a set of locking fingers 76 arranged at each end thereof for interaction with and securing of the latch plate 66 in a predetermined position with respect to the slider 50.

The latch plate track 70 will be angled such that when the actuator 36 is in its home or first position the latch plate 66 and hence locking members 72 will be at an inward position towards the locking orifices 18 on the rail 12 such that the locking members 72 are engaged with the locking orifices 18 on the rail 12 to securely hold the sliding storage console 10 at a predetermined position. When an operator of the sliding console 10 moves the handle 32 to the released position and hence moves the cable 34 which slides the actuator 36 with respect to the lower and upper housing 38, 40, will in effect move the actuators and second guide member 80, which extends from a bottom surface thereof, within the tracks 70 of the latch plates 66. One guide member 80 extends from each end of the actuator 36 into each track 70 of the latch plates 66 attached to the lower housing 38 of the sliding console 10. The guide member 80 will slide along the track 70, thus moving the latch plate 66 and hence locking members 72 from engagement with the locking orifices 18 of the rail 12 thus allowing for the user to slide the sliding storage console 10 to another location along the rail 12. The angle of the track 70 of the latch plate 66 may determine the amount of lateral movement away from the locking orifices 18 by each of the latch plates 66. Therefore, designing of the track 70 and its angle with respect to the upper and lower housing 40, 38 may be varied to create a predetermined amount of movement for the latch plate 66.

The sliding console 10 also may include at least one glide 82 arranged on a bottom surface of the slider 50. The glide 82 generally is made of a PTFE material which will allow for easier sliding along the rail 12 the slider 50. In the embodiment shown a first and second glide 82 are arranged at or near the end on the bottom surface of the slider 50. The glide members 82 generally have an L-shaped cross section such that the inner surface of the slider 50 also has the glide member thereon for any interaction with the tracks on the rail 12 of the sliding console 10. These glides 82 will allow for easier movement and easier sliding efforts for the user of the automotive vehicle within the system. It should be noted that any other type of material such as any other metal, plastic, composite, ceramic, or natural material may be used for the gliders 82 and that any other shape may be used for the gliders 82 including those that do not include a generally L-shaped cross section such that only the interior or exterior surface of the sliders 50 are covered by the glider 82 or just the bottom or top surfaces of the slider 50 are covered by the glide 82.

The sliding console 10 may include a predetermined shaped piece of foam 84 arranged within each of the pockets 62 on each of the sliders 50. Arranged on a top surface of the foam 84 may be a slider plate 86 in each of the pockets 62. Therefore, in the embodiment shown four pieces of foam 84 and four slide plates 86 are arranged within the pockets 62 of the slider 50. In the embodiment shown the shapes generally take those of a rectangle, however any other shape material may be used for the foam 84 and slide plate 86. The foam 84 and slide plate 86 may allow for a tight fit with small tolerances between the upper and lower portion of the rail 12 and the upper and lower portion of the slider 50. The foam 84 will act as a spring that will urge the slide plate 86 into contact with a surface of the upper rail 20 while also urging the glide members 82 into contact with a surface of the lower rail 14. It should be noted that any type of plastic, rubber, composite, metal or natural material may be used for the foam 84. It should also be noted that the slide plate 86 is made of a PTFE material, however any other plastic, ceramic, metal, composite, or natural material may also be used for a slide plate 86.

In operation, the operator of the automotive vehicle will have the sliding console 10 arranged thereon such that the console is capable of being removed or is permanently fixed in sliding engagement to the rail 10. Any other type or known method of securing the sliding console 10 to the rail 12 may be used with the present invention. In one contemplated embodiment the sliding console 10 will be arranged on the rail 12 prior to insertion into the automotive vehicle such that once the sliding console 10 is on the rail 12, the rail 12 will be fixed to the interior surface of the automotive vehicle. However, it is also contemplated to have a system wherein the rail 12 is installed first in the vehicle and then the sliding console 10 is arranged thereon either permanently or in a removeable type embodiment. Therefore, with the rail 12 arranged within the automotive vehicle interior as required, the user will slide and position the sliding console 10 anywhere along the rail 12 at any predetermined position. Generally, the locking orifices 18 of the rail 12 will be arranged along the entire length thereof thus allowing for numerous locations for the sliding console 10 depending on the user of the vehicle. Therefore, when the operator of the vehicle has slid the sliding console 10 to where they want it they will release the handle 32 to its home position thus engaging the locking member 72 of the latch plate 66 with the locking orifices 18 arranged on the rail 12. When the user of the vehicles wishes to move the sliding console 10 to another predetermined location along the rail 12 within the interior of the vehicle, the user will lift the handle 32 to its released position thus disengaging the locking members 72 from the locking orifices 18 and slide the sliding console 10 to any position along the rail 12 having locking orifices 18 arranged therein. Therefore, numerous positions may be used within the vehicle for the sliding console 10 by the user depending on the needs of the user. This will allow for a multi configuration interior to be used by the user depending on the needs and the vehicle component systems.

Other contemplated embodiments may also be designed and shown from the above mentioned discussion and the attached drawings to include any known designs in the art for a sliding storage console.

Many modifications and variations of the present invention are possible in light of the above teachings. Therefore, within the scope of the appended claims, the present invention may be practiced otherwise than as specifically described.

What is claimed is:

1. A sliding console for use with a rail in a vehicle, said console including:
    a body;
    a upper housing contacting said body;
    a handle arranged on said body;
    a lower housing contacting said upper housing;
    an actuator slidingly arranged between said upper and lower housing;
    a slider connected to said lower housing; and
    a latch plate engaged with said actuator.

2. The sliding console of claim 1 further including a cable arranged between said actuator and said handle.

3. The sliding console of claim 2 further including a spring arranged between a surface of said actuator and a surface of said upper housing.

4. The sliding console of claim 1 further including a glide member arranged on a surface of said slider.

5. The sliding console of claim 1 further including a foam member arranged on a top surface of said slider.

6. The sliding console of claim 5 further including a slide plate arranged on a surface of said foam member.

7. The sliding console of claim 1 further including a latch insulator arranged between said slider and said latch plate.

8. The sliding console of claim 1 wherein said latch plate having at least one locking member extending from a surface thereof.

9. The sliding console of claim 1 wherein said latch plate is held at an outer edge of said slider when the console slides along the rail.

10. The sliding console of claim 1 wherein said latch plate engages with said rail to lock the console at a position within the vehicle.

11. The sliding console of claim 1 wherein said latch plate and said lower housing are made of aluminum.

12. A sliding console system for use on any interior surface of a vehicle, said system including:
- a rail secured to an interior surface of the vehicle;
- a body sliding arranged on said rail;
- an upper housing contacting said body;
- a handle arranged on said body;
- a lower housing contacting said upper housing;
- an actuator arranged between said upper and said lower housing;
- a slider connected to said lower housing and engaged with said rails; and
- a latch plate arranged on said slider and engaged with said actuator.

13. The system of claim 12 further including a cable arranged between said actuator and said handle.

14. The system of claim 13 further including a spring arranged between a surface of said actuator and a surface of said upper housing.

15. The system of claim 12 further including a glide member arranged on a surface of said sliders.

16. The system of claim 12 further including a foam member arranged on a top surface of said slider.

17. The system of claim 16 further including a slide plate arranged on an surface of said foam member.

18. The system of claim 12 further including a latch insulator arranged between said slider and said latch plate.

19. The system of claim 12 further including a second slider connected to said lower housing.

20. The system of claim 12 wherein said rail includes a lower rail and an upper rail secured to said lower rail.

21. The system of claim 20 wherein said latch plate having at least one locking member extending from a surface thereof.

22. The system of claim 21 wherein said locking member engages with said upper rail to lock said base at a predetermined position on said rail.

23. The system of claim 22 wherein said locking member moves away from and disengages from said upper rail via said handle to allow said base to slide along said rail to another position in the vehicle.

* * * * *